United States Patent
Kunz

(10) Patent No.: US 6,239,563 B1
(45) Date of Patent: May 29, 2001

(54) ELECTRONIC STARTING AND OPERATING CONTROL SYSTEM FOR A SINGLE-PHASE SYNCHRONOUS MOTOR WITH A PERMANENT MAGNETIC ROTOR, ALSO IN CASE OF FAILURE

(76) Inventor: Wunnibald Kunz, Ifenstrasse 4, D-88045 Friedrichshafen (DE)

( * ) Notice: Subject to any disclaimer, the term of this patent is extended or adjusted under 35 U.S.C. 154(b) by 0 days.

(21) Appl. No.: 09/341,945
(22) PCT Filed: Jan. 21, 1998
(86) PCT No.: PCT/DE98/00172
§ 371 Date: Oct. 20, 1999
§ 102(e) Date: Oct. 20, 1999
(87) PCT Pub. No.: WO98/32214
PCT Pub. Date: Jul. 23, 1998

(30) Foreign Application Priority Data

Jan. 21, 1997 (DE) ............................................. 197 01 856

(51) Int. Cl.[7] ...................................................... H02P 6/00
(52) U.S. Cl. .......................... 318/254; 318/700; 318/721
(58) Field of Search ................................... 318/138, 254, 318/439, 700, 720, 721, 722, 723, 724, 430, 431

(56) References Cited

U.S. PATENT DOCUMENTS

| | | | |
|---|---|---|---|
| 4,769,581 | * | 9/1988 | Rilly ..................... 318/254 |
| 4,780,652 | * | 10/1988 | Rilly ..................... 318/254 |
| 5,434,491 | | 7/1995 | Marioni . |
| 6,091,170 | * | 7/2000 | Mayes et al. ........................ 318/700 |

FOREIGN PATENT DOCUMENTS

| | | |
|---|---|---|
| 195 33 344 | 3/1997 | (DE) . |
| 195 34 423 | 3/1997 | (DE) . |
| 0 666 639 | 8/1995 | (EP) . |

\* cited by examiner

Primary Examiner—Khanh Dang
(74) Attorney, Agent, or Firm—Venable; Robert Kinberg

(57) ABSTRACT

Control of the start-up and operation of a single phase synchronous motor with a permanent-magnet rotor (9) is proposed, wherein the single-phase synchronous motor (1) comprises at least one stator winding (5, 6) which is connected in series with an AC voltage sources, in which there are a sensor (10) for measuring the rotor magnetic field and an arrangement for phase-gating (11, 13), which connect the AC voltage source to the stator winding as a function of the magnetic-field sensor signal, in such a manner that the current which flows in consequence in the stator winding produces a rotor torque in the rotation direction without any critical states occurring with respect to demagnetization of the rotor. To this end, after the end of a delay time for phase-gating control, the stator current is not triggered until predefined conditions are satisfied. Momentary overloading of the motor and stalling are reliably prevented. A signal which reflects the load level on the motor is produced for external use. The control sequence is carried out for each running phase, as a function of the voltage signal and current signal, as well as the magnetic-field sensor signal and its time derivative, such that a driving torque is produced. In the operating phase, the phase difference between the magnetic-field sensor signal and the current signal is evaluated and regulated so as to achieve maximum efficiency. The effective power output of the motor is determined from the current signal and this phase difference.

13 Claims, 2 Drawing Sheets

ELECTRONIC STARTING AND OPERATING CONTROL SYSTEM FOR A SINGLE-PHASE SYNCHRONOUS MOTOR WITH A PERMANENT MAGNETIC ROTOR, ALSO IN CASE OF FAILURE

The invention relates to control of the start-up and operation of a single-phase synchronous motor with a permanent-magnet rotor, taking into account disturbance cases and the maximum permissible demagnetization current, in particular for driving the circulation pump in dishwashers and the compressor in refrigerators.

PRIOR ART

Purely passive single-phase synchronous motors which are used, for example, for driving small pumps and are operated without any closed-loop control are in widespread use. Such synchronous motors have an extremely simple construction, and thus a low cost outlay. As a result of the difficulty in start-up owing to the mass inertia of the parts to be moved, these motors are limited to a rating of about 30 W. They are thus not suitable for circulation pumps in dishwashers, unless additional measures are taken.

With such single-phase synchronous motors with permanent-magnet excitation, reliable start-up is in principle possible only if special measures, such as airgap forming or additional magnets or the like, are taken to ensure that the flux vector of the rotor magnet in the magnetic rest position is not parallel to the flux vector of the stator.

The magnetic rest position of the rotor is in this case the position of the rotor at which its magnetic field, without any additional current flow, has the lowest energy content and at which it remains stationary in the absence of friction influences.

One measure in order to increase the rating of such a motor above 30 W may be, for example, a special coupling between the motor and pump, in which case the pump is also of special design, although start-up takes place passively without additional electronic aids.

The performance range of such arrangements of synchronous motors is also limited, in particular by the irregular torque profile in the start-up range.

Furthermore, their efficiency is heavily dependent on the applied voltage, as a result of which the synchronous motor for a known load must also be designed for the worst-case operating voltage range.

Patent Application DE 195 33 344, which has not yet been published, describes an apparatus for controlling a single-phase synchronous motor, in which the single-phase synchronous motor includes at least one stator winding which is connected in series with the AC voltage source, a sensor for measuring the magnetic field of the stator, preferably a Hall sensor, a sensor for measuring the current, a sensor for measuring the supply voltage, an electronic switch, preferably one which changes to the switched-off state (for example a triac) at the current zero-crossing, and an electronic circuit which logically links the signals from the sensors and controls the switch appropriately.

With this apparatus, during the starting process, means for phase-gating control of the supply voltage (electronic switch and electronic circuit) in accordance with the polarity of the magnetic-field sensor and the required rotation direction are enabled and the electronic switch is switched after the end of a delay time, so that a driving torque is then produced in the required rotation direction.

During run-up, time intervals for enabling the means for phase-gating control are defined from the magnitude and the gradient of the signal of the magnetic-field sensor, and the AC voltage is switched on after the end of a delay time.

During synchronous running, time intervals which occur in a corresponding manner, likewise periodically, are defined, in which the means for phase-gating control are enabled, and the AC voltage is switched on after the end of a delay time.

One disadvantage arises in the starting phase from the fact that such a single-phase synchronous motor has a good and a poor starting direction in the magnetic rest positions.

The good starting direction is in this case that in which the flux vector of the rotor magnet (see FIG. 1) points in the opposite direction to the flux vector of the stator. Its speed can then rise virtually over 180°, and it can overcome the dead point at which the flux vectors of the rotor and stator are parallel. In the other direction, the angle to the dead point is only a few degrees, and the probability of overcoming the dead point is correspondingly poor.

In the case of this apparatus, a confident assumption is now made that the rotor starts to carry out an oscillating movement, particularly in the poor starting direction, which is increased by resonance effects and, at a specific amplitude, allows the rotor to rotate. This method may require a current which causes the permanent magnet to be at least partially demagnetized. This is particularly true if there are friction effects which prevent the desired resonance effect due to excessive damping, or if poorly matched rotor and load rotation masses reduce this effect.

The run-up is also prevented, in particular, if the rotor sticks to some extent in the bearings, which cannot be excluded after a lengthy shutdown time. An additional disadvantage results from the characteristics of Hall sensors. These have a large offset voltage and high temperature drift, which make it possible to detect the position of the magnetic rest position unambiguously only with major complexity, which is not feasible here for price reasons.

The process of running such a motor up to synchronous running is governed by the fact that no driving current pulses are available over relatively long time intervals, due to the discrepancy between the power supply frequency and the rotor rotation speed. Thus, in order to provide the required mean drive torque, the driving current pulses which are present must be greater. If one of these current pulses now occurs in such a manner that the flux vectors of the rotor and stator are essentially parallel and opposite, the rotor magnet can be at least partially demagnetized, if the current pulse and thus the magnetic field are of sufficient intensity.

A disadvantage of the said apparatus is that it has no device to limit the current in these areas of risk.

A further disadvantage during run-up and synchronous operation results, in particular, from the fact that the means for phase-gating control are enabled first of all, and the means are then switched on after a delay time. During this delay time, the rotor continues to rotate and it is possible for the current which builds up to produce a braking effect, or for the rotor to rotate into a region in which there is a risk of demagnetization.

This may be the case not only at rotation speeds greater than the synchronous rotation speed, but also if the angle at the time when the means for phase-gating control are enabled is not ideal.

A disadvantage of the said apparatus also results from the fact that periodically occurring time intervals are defined for enabling the means for phase-gating control. Time intervals imply the use of timing elements, for example timers, which, however, are no longer in synchronism with the rotor rotation during acceleration or deceleration of the motor, and thus lead to triggering errors which can cause braking of the motor or, as is even worse, can increase the risk of demagnetization.

A further disadvantage results from the use of a triac, particularly if the moment of inertia of the rotor and the connected pump is small and the motor is thus highly dynamic, as a result of which over-speeding is possible. In this case, at rotation speeds greater than the synchronous rotation speed, there is a very high risk (arising from a current pulse which can no longer be switched off if a triac is used) of the rotor ending up, due to its fast rotation, in an angle range in which the magnetic field resulting from the current pulse can lead to demagnetization of the rotor.

A further disadvantage results from the use of cheap Hall sensors. Owing to the wide scatter in their characteristics, the determination of the rotor magnetic field in mass-produced motors is likewise subject to wide scatter. This leads to errors, for example when measuring amplitude values for defining times at which the electronic switch is intended to be triggered, and these errors exacerbate start-up and operation and increase the risk of demagnetization.

If the motor is overloaded or in the event of stalling, there are no measures to prevent unacceptable states which endanger operation.

For higher-level control systems, for example the controller for the dishwasher, it would also be advantageous if the motor were to signal the level of the pump load. In the prior art, this is possible from the externally accessible data only with costly, additional outlay.

OBJECT OF THE INVENTION

The object of this invention is to avoid these disadvantages with very low costs and of making the single-phase synchronous motor insensitive to load variations and disturbances, such as stalling, overloading or overspeeding.

In addition, the load on the motor is intended to be determined in a simple way, for higher-level control purposes. In this case, it must be remembered that cos φ and the rotor angle of the motor also vary with the load on the motor and supply voltage changes, thus making it harder to determine the motor load. In addition, it must be remembered that synchronous running of the motor becomes unstable if the load falls below a specific level.

These characteristics also occur if extremely cheap Hall sensors are used, and if electronic controllers, for example microcontrollers, in the cheapest price class are used. It must be remembered in this case that Hall sensors in the cheaper price class also have severe temperature drift in the offset voltage and sensitivity, apart from high offset voltages.

Together with the scatters and the characteristics of the magnet system, this can lead to signal variation by a factor of up to 3 from motor to motor. Electronic control units in the form of microcontrollers or ASICs in the cheaper price class furthermore have very limited computation performance, which severely restricts the additional complexity for sequence and control operations.

ACHIEVEMENT OF THE OBJECT

The object is achieved by the features of the present invention wherein upon expiration of the delay time the electronics unit (13) enables the phase gating means to trigger the stator current when the electronics unit also determines that the amplitude of the magnetic-field signal is within predetermined triggering amplitude limit values and the polarity of a half cycle of the AC voltage signal is a polarity that produces a current which provides a driving torque.

In order to describe the operation of the motor, and its control, operation is expediently split into 3 operating phases.

The start-up, in which the motor is accelerated from rest to a defined movement of the rotor, The run-up, in which the motor is accelerated from the defined movement to synchronous running, and Synchronous running, which represents the normal operating phase of the motor.

During run-up and synchronous running, it has been found to be advantageous for the means for triggering the stator current to be enabled after a delay time, which starts with the zero crossing of the supply voltage and defines the magnitude of the current, has elapsed, when the amplitude of the sensor signal from the measurement of the magnetic field is within predefined triggering limits in the form of amplitude values and the polarity of the AC voltage half-cycle produces a current which provide a driving torque. In principle, the triggering limits are two angles which are defined such that the maximum value of the field produced by the current pulse occurs, taking account of the rotation speed and the current build-up, when the magnetization vector of the rotor is in the quadrant I, II or III, IV (see FIG. 1 or 2) in which the stator current has a driving effect. Overall, the procedure according to the invention has the advantage that the triggering conditions are checked at the time of potential triggering and not at the start of the delay time.

These triggering limits are advantageously normalized using the peak value of the magnetic-field sensor, in order to preclude signal fluctuations resulting from scatters and temperature drifts in the magnetic-field sensor and the magnetic-field system of the rotor. Furthermore, the limits are preferably varied continuously, corresponding to the rotation speed, during run-up and synchronous running.

It has been found to be particularly advantageous for start-up if, during starting, the supply voltage is connected to the winding of the stator after a starting delay time for phase gating, such that a driving torque is produced in the required rotation direction, the delay time is then slowly reduced until a peak current occurs which is less than the demagnetization current. If, by that time, the signal from the magnetic-field sensor has not reached a predetermined value, the rotor has not started. In this case, the rotation direction of the motor is reversed and the supply voltage is connected to the winding of the stator once again, starting with the starting delay, until the maximum permissible peak current is reached, or the motor has started. This process is repeated until the rotor has rotated sufficiently far for the predetermined value of the magnetic-field sensor to be reached. At this instant, the required rotation direction is switched on again, and the run-up process starts. The advantage of this method is that the start-up process takes place with high reliability and in a very short time, even if friction is present, in the direction in which the rotor starts well and, furthermore, in the event of the rotor shaft sticking in the bearings, as could possibly occur after a lengthy shutdown, is hammered loose by the pulsating drive torque which alternates at short time intervals.

Furthermore, it has been found to be advantageous during run-up and synchronous running for the magnitude of the current to be limited as a function of the rotor angle and/or as a function of the magnetic-field signal. This allows the current to be reduced in the angle range in which the stator field and rotor field oppose one another, that is to say where there is the risk of rotor demagnetization. By lengthening the delay time, the current is then reduced to non-critical levels. The time to start the lengthened delay time is the delay time which was determined for the maximum permissible current during the starting process.

Furthermore, it is particularly advantageous if (in order to define whether the current maximum occurs in the angle range in which the rotor can be demagnetized) a limit value is calculated which is determined continuously, for example in each half revolution of the rotor, which takes account of the time for the current to build up as well as the rotation speed, and is normalized using the maximum of the signal from the magnetic-field sensor. If the measured magnetic-field sensor signal is above the calculated limit value, it is unnecessary to lengthen the delay time (additional delay time).

For rotation speeds considerably higher than the synchronous rotation speed, it has been found to be advantageous for connection of the supply voltage to the stator winding (5, 6) to be generally inhibited. There, the ratio of the current build-up time to the time of a revolution is so disadvantageous that the maximum level of the current which builds up can rotate into the angle region where there is a risk of demagnetization.

If the motor is overloaded at times, it must remain in safe operating states. There is a risk of rotor demagnetization in this case as well. During synchronous running, such overloading of the motor can cause desynchronization and a reduction in the motor rotation speed. This desynchronization means that the rotor of the motor is no longer running in synchronism with the power supply frequency. During run-up, such an overload results in the motor rotation speed falling.

In the event of an overload during synchronous running, it has been found to be highly advantageous to detect the overload by measuring the phase angle between the stator current and the magnetic-field signal and to assess the fact that a predetermined limit value has been exceeded as being an overload. In this case, the control laws for synchronous running are switched off, and those for the run-up are switched on.

For running-up, it has been found to be advantageous if the overload is accepted if the motor rotation speed has fallen by a predetermined value. In this case, the control laws for run-up are switched off, and the control laws for start-up are switched on.

One particular overload case is motor stalling, for example as a result of foreign bodies entering the pump. In such a case, one vane of the pump impeller strikes the solid body. The pump impeller is suddenly moved backward. During reverse rotation, one vane of the impeller generally strikes the solid body again. The possible angle through which the impeller can move in this case is, as a rule, in the order of magnitude of the vane pitch of the impeller, but in any case is considerably less than 360°. As a consequence of this, a maximum of the magnetic-field signal is less than the maxima of the magnetic-field signal in normal operation. This fact can advantageously be used for detection of such a stalled situation. In such a case, it has been found to be advantageous to switch off the control laws (run-up or synchronous operation) being used at that time, and to switch on start-up, provided the peak value of a magnetic-field amplitude is less than a predetermined value.

When determining the motor output, it is necessary to distinguish between whether the pump load which can be detected as a viscous damping is or is not sufficient for stable synchronous running.

If it is sufficient, then the peak value of the current, weighted by the phase angle between the current and the magnetic field of the rotor, is used as a measure for the motor output. If this is not the case, then it has been found to be advantageous for the simplest case, where the intention is to detect only that this limit value has been undershot, to use for this purpose the alternation which is to some extent continuous), resulting from this between the control laws for synchronous running and run-up.

If it is also intended to obtain a measure for the motor output in this case, then it has been found to be feasible to use the mean value of the difference between the maximum and minimum rotation speeds that then occur.

Description of the motor with reference to the drawings:
The details of the invention are illustrated in the drawings and will be explained below.

In the figures:

FIG. 1 shows an exemplary embodiment of the controller for a single-phase synchronous motor, and a single-phase synchronous motor with a rotor having permanent magnets.

Figure 1:
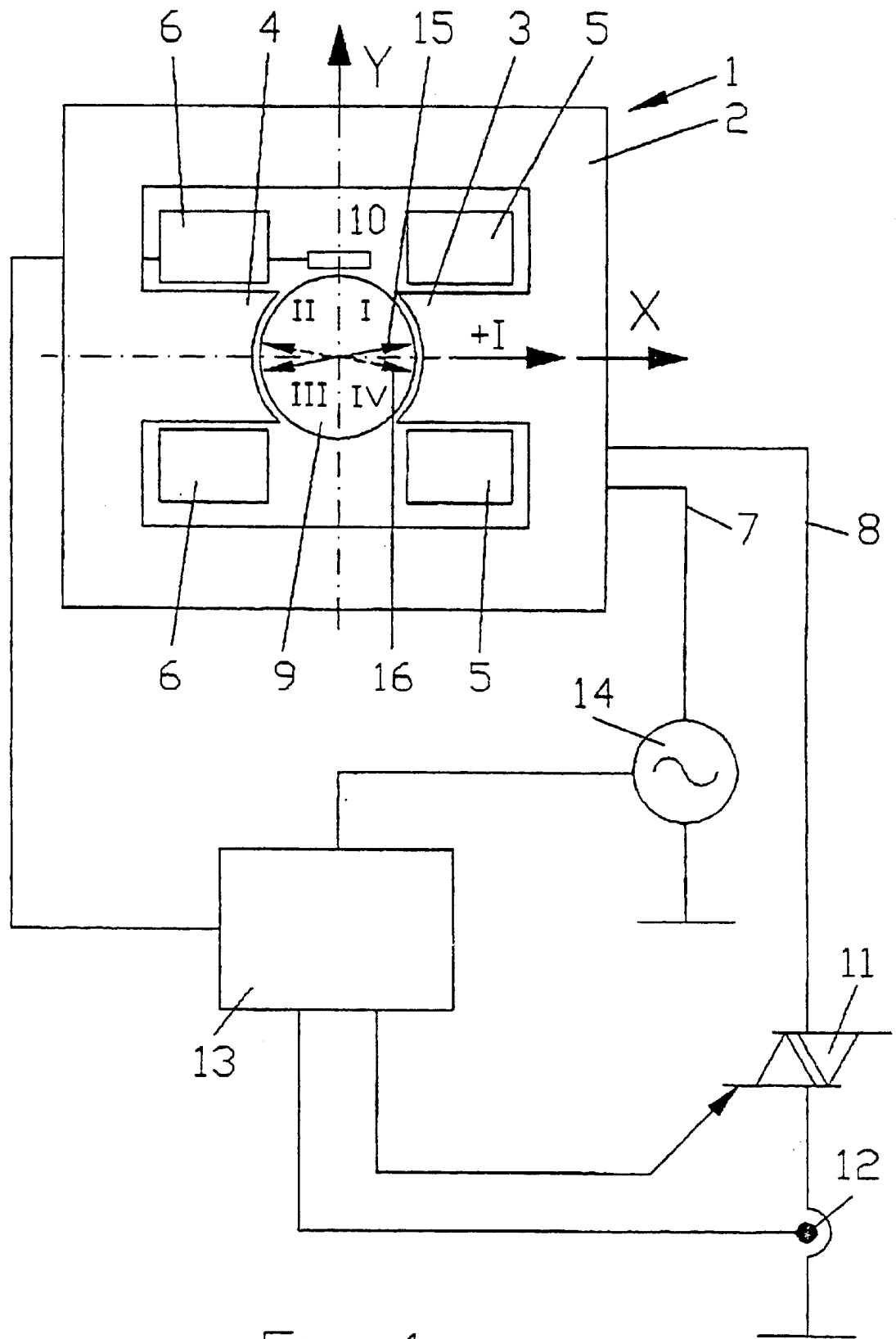
FIG. 1 shows a single-phase synchronous motor with sensors and a hardware section of the controller, with an indication of the magnetic rest positions, caused by forming of the airgap

The single-phase synchronous motor (1) comprises a stator (2) on whose two poles (3, 4) two coils (5, 6) are seated which, connected in series, form the stator winding and have the connecting cables (7, 8), as well as a rotor (9) having permanent magnets a north pole and south pole, whose possible magnetic rest positions are represented by the solid double arrow (15).

In this case, each arrow of the double arrow (15) can represent the north pole or south pole.

The two opposite magnetic rest positions result, in particular, from forming of the airgap between the rotor and stator and, as is shown, are at several degrees from the X-axis, the pole axis of the stator, and thus allow a starting torque.

Figure 2:
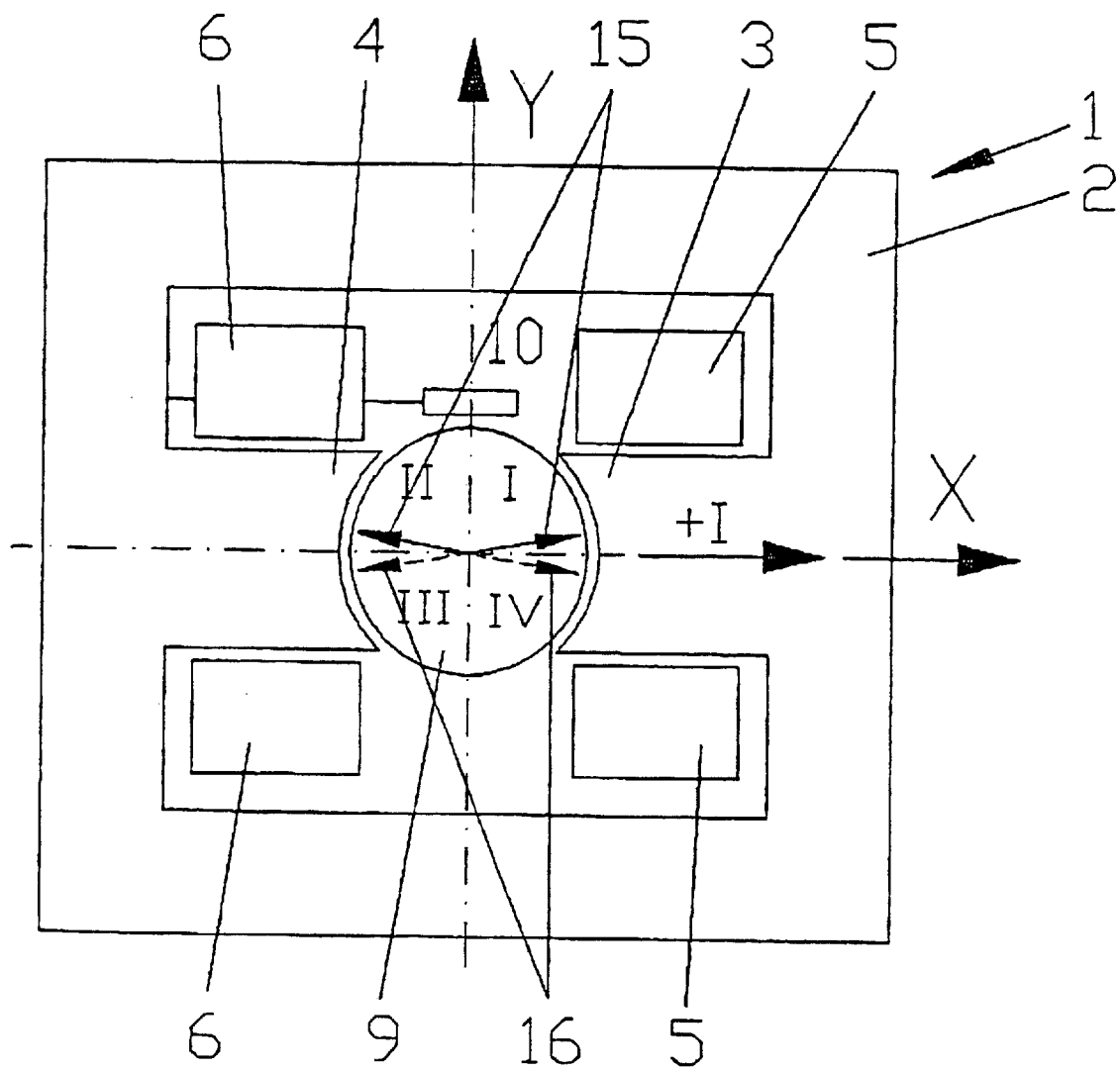
FIG. 2 shows a single-phase synchronous motor with magnetic rest positions, caused by an additional magnet.

FIG. 2 shows a single-phase synchronous motor whose magnetic rest positions (15) are located in quadrants I and II (solid arrows). Magnetic rest positions of this type occur when an additional magnet is used.

The following descriptions are based on a positive current producing a stator field in the positive X-direction.

As FIGS. 1 and 2 show, each magnetic rest position has a good starting rotation direction and a poor starting rotation direction. If, for example, a positive current is applied in the magnetic rest position (15) on the right in FIG. 1, then the rotor is rotated a few degrees clockwise in the X-direction, and no further rotation can take place, based on static considerations overcoming the dead point is difficult, particularly if there are any friction influences. If, on the other hand, a negative current is applied, then the rotor is rotated counterclockwise, and it can absorb movement energy over virtually 180 degrees and overcome the dead point. It starts considerably better in this direction.

When using the rotor magnet as a sensor magnet, the magnetic-field sensors can be fitted only at points at which the stator current does not lead to additional signals in the sensor, since it would otherwise be impossible to deduce the position of the rotor. The position of the Hall sensor (10)

shown in FIGS. 1 and 2 is one such neutral point. This arrangement leads to a very small sensor signal at the magnetic rest positions. In conjunction with the offset (which is avoidable only with relatively high outlay) and its temperature and long-term drift, it is virtually impossible to detect the location of the magnetic rest position accurately. If, corresponding to FIG. 1, the actual magnetic rest positions (15) are located in quadrants I and III, then the sensor can also indicate, for example as a result of an offset, positions (16) in quadrants II and IV. A similar situation applies in FIG. 2, in which the actual magnetic rest positions are located in quadrants I and II but, as a result of its offset error, the magnetic-field sensor can also indicate quadrants III and VI. It is thus impossible for the control unit to use the magnetic-field sensor to determine the direction in which the rotor can start well. The starting process is thus carried out such that the electronic switch (11) connects the supply voltage to the coil connections 7, 8 after a delay time, the phase-gating time, such that a torque is produced in the required rotation direction, and, after the current has fallen to zero, disconnects it from them, again. When switched on for the first time, the delay time is such that none of the starting operating states leads to a current resulting in demagnetization of the rotor magnet. After this, the delay time is reduced until a predetermined maximum current occurs, which is likewise still less than the demagnetization current. If the rotor has not rotated by a specific amount in this time, that is to say the magnitude of the magnetic-field sensor signal has still not risen to a predefined value, the rotation direction is reversed, and the process is repeated. This process is repeated until the rotor has rotated through this predetermined value. The original required rotation direction is then selected, and the rest of the run-up process is carried out. This type of starting process has the advantage that the starting process is carried out with maximum reliability and in a very short time, even when friction is present, and without any resonance effects. A further advantage results if the rotor has stuck in its bearings after a lengthy shutdown. In this case, it is hammered loose alternately by the torque pulses.

In the run-up phase and in synchronous operation, so-called triggering limits are defined after each half revolution of the rotor. These limits comprise a first and a second amplitude value of the magnetic-field sensor signal. These are determined such that triggering between the two values leads to a current pulse which produces a driving torque. The determination of this takes account of the present rotation speed and the maximum value of the amplitude of the magnetic-field sensor (10) in an appropriate manner. The delay time for phase gating is started whenever the supply voltage passes through zero. Once it has elapsed, the electronic switch (11) connects the supply voltage to the stator coils (5, 6) when the appropriate supply voltage half-cycle polarity occurs, the amplitude of the magnetic-field sensor is within the triggering limits, and the time derivative of the magnetic-field sensor signal has the correct polarity, that is to say a driving torque can be expected. Before the electronic switch (11) connects the stator coils to the supply voltage, an additional check is carried out to determine whether the subsequent current pulse maximum will occur at a rotor position in which the field vector of the stator field points in the opposite direction of the field vector of the rotor magnet, and thus has a demagnetizing effect. If this is the case, the delay time is lengthened, and the current is thus reduced to a safe value.

The delay time for phase gating is reduced in steps during the run-up process as long as the synchronous rotation speed has not yet been reached, and is increased when this speed is exceeded. In this way, the acceleration current is controlled as a function of the load in a simple manner. During synchronous running, the phase difference between the signal from the magnetic-field sensor and that from the current is regulated via the delay time for phase gating so as to achieve maximum efficiency. In the case of the arrangement described here, this occurs when the phase difference is regulated to be zero. This results in load and voltage matching which keeps the power loss and thus the motor physical size and production costs low.

In the event of overloading or underloading, there is a risk of the motor dropping out of synchronization and that the control laws which apply to synchronized running will no longer be appropriate. This situation is detected by comparing the magnitude of the phase angle between the motor current and the magnetic-field signal with a predefined value, and by selecting the control laws for run-up if this is exceeded.

If the rotor becomes blocked, for example if an appropriate foreign body enters the pump impeller, the rotor will no longer rotate and will bounce back.

In this case, the maximum amplitude of the magnetic-field signal will be considerably less than in normal operation. Using this criterion, the presently applicable control laws for run-up or synchronous running are replaced by those for start-up, thus preventing the motor from being damaged by incorrectly acting currents.

A measure of the operating output of the motor is obtained in a simple manner by the type of regulation selected in synchronous operation, in such a way that the peak value of the current pulses is determined and is multiplied by the cosine of the phase angle between the current signal and the magnetic-field signal, or an approximation of this. The effects of cos$\phi$ and those of different supply voltages are thus largely precluded. In the situation where the load on the motor is too low to allow stable synchronous running, either the change, which is to some extent continuous, between synchronous running and run-up is detected and is used to form a signal which reports that this limit load has been undershot or, if a measure of the motor output is required in this case as well, the mean value over a period of time of the difference between the maximum and minimum rotation speeds resulting from the fluctuation in rotation speed that occurs in this case is then used for this purpose.

What is claimed is:

1. An apparatus for controlling the start-up and operation of a single-phase synchronous motor having a permanent-magnet rotor having a magnetic field and at least one stator winding having a stator current connected in series with an AC voltage source for supplying an AC supply voltage, the apparatus comprising:

at least one field sensor for providing a signal representing a measure of a magnetic field amplitude of the rotor;

a current sensor for providing a signal representing a measure of a stator current;

a voltage sensor for providing a signal representing a measure of the AC supply voltage;

phase-gating control means for phase-gating control of the supply voltage; and an electronics unit which processes the sensor signals and switches the means for phase-gating control, wherein the electronics unit sets a first delay time which starts at a zero crossing of the AC supply voltage signal and defines the magnitude of the current signal, and wherein upon expiration of the first delay time the electronics unit enables the phase-gating means to trigger the stator current when the electronics unit also determines that the amplitude of the magnetic-field signal is within predetermined triggering amplitude limit values and a polarity of a half cycle of the AC voltage signal is a polarity that produces a current which provides a driving torque.

2. An apparatus for controlling the start-up and operation according to claim 1, further comprising means for continuously varying the triggering limit values in correspondence with the rotation speed during run-up and synchronous running and normalizing the triggering limit values via a maximum value of the field sensor signal and a minimum value of the field sensor signal.

3. An apparatus for controlling the start-up and operation according to claim 1, wherein the electronic control unit comprises means for starting an additional delay time, once the delay time between the zero crossing of the AC supply voltage signal and the enabling of the potential of the phase-gating control means has elapsed, to reduce the stator current further if the maximum stator current is predicted to occur in a rotation angle range of the rotor in which the rotor can be demagnetized.

4. An apparatus for controlling the start-up and operation according to claim 3, wherein the additional delay time is greater than or equal to the delay time which was determined for the maximum permissible current during the starting process.

5. An apparatus for controlling the start-up and operation according to claim 1, further comprising, in order to define whether the maximum current falls in the rotation angle range in which the rotor can be demagnetized, means for calculating a limit value that is determined continuously, that takes account of the rotor rotation speed and the time for the current to build up, and that is normalized using the maximum value of the signal from the magnetic-field sensor.

6. An apparatus for controlling the start-up and operation according to claim 1, further comprising means for inhibiting the enabling of the phase-gating control means when the rotor rotation speed is greater than a predetermined value.

7. An apparatus for controlling the start-up and operation according to claim 1, characterized in that the electronic control unit comprises means for controlling the current during a starting phase as a function of the starting rotor rotation direction and the signals from the magnetic-field sensor and voltage sensor, with a preset starting delay time such that a driving torque is produced, the electronics unit further comprising means for reducing the delay time until a preset maximum current is reached, means for reversing the required rotor rotation direction, and thus the torque direction, if the amplitude of the magnetic field sensor signal has not reached a predetermined value, means for reducing the first delay time, commencing with the starting delay time, until the maximum current is reached, and means for repeating (a) controlling the current during the starting phase as a function of the starting rotor rotation direction and the signals from the magnetic-field and voltage sensor with a preset delay time such that a driving torque is produced, (b) reducing the delay time until a preset maximum current is reached, (c) reversing the rotor rotation direction if the amplitude of the magnetic field sensor signal has not reached a predetermined value, and (d) reducing the first delay time until the maximum current is reached until the predetermined amplitude of the magnetic field sensor signal is reached and the electronics unit switches over to the required starting rotation direction, whereby the motor runs up.

8. An apparatus for controlling the start-up and operation according to claim 1, further comprising means for forcing an end to a synchronous running operating phase if the magnitude of the phase angle between the measure of stator current and the amplitude of the magnetic-field sensor signal becomes greater than a predetermined value.

9. An apparatus for controlling the start-up and operation according to claim 1, further comprising means for forcing an end to a run-up operating phase if the rotor rotation speed has fallen below a predetermined value.

10. An apparatus for controlling the start-up and operation according to claim 1, further comprising means for forcing an end to a run-up or synchronous running operating phase and a change to a start-up operating phase if the peak value of the signal from the magnetic-field sensor is considerably less than a peak value of the magnetic field sensor signal that would occur during normal operation.

11. An apparatus for controlling the start-up and operation according to claim 1, further comprising means for weighting the peak value of the signal from the current sensor with the phase angle between the measure of the stator current and the amplitude of the magnetic-field sensor signal and for using the weighted peak value to describe the motor output during stable synchronous running.

12. An apparatus for controlling the start-up and operation according to claim 1, further comprising means for producing a "limit load for stable synchronous running not reached" message if a changeover between the synchronous running and run-up operating phases occurs more than once within a defined time.

13. An apparatus for controlling the start-up and operation according to claim 1, further comprising means for measuring the motor output other than during stable synchronous running using a low-pass-filtered difference between a maximum rotor rotation speed and a minimum rotor rotation speed resulting from fluctuation in rotor rotation speed occurring other than during stable synchronous running.

* * * * *